United States Patent
Oldfield et al.

(10) Patent No.: US 12,145,877 B2
(45) Date of Patent: *Nov. 19, 2024

(54) COATED GLAZING

(71) Applicant: PILKINGTON GROUP LIMITED, Lathom (GB)

(72) Inventors: John William Oldfield, St. Helens (GB); Srikanth Varanasi, Ottawa Hills, OH (US)

(73) Assignee: Pilkington Group Limited, Lathom (GB)

( * ) Notice: Subject to any disclaimer, the term of this patent is extended or adjusted under 35 U.S.C. 154(b) by 102 days.

This patent is subject to a terminal disclaimer.

(21) Appl. No.: 17/910,066

(22) PCT Filed: Mar. 11, 2021

(86) PCT No.: PCT/EP2021/056258
§ 371 (c)(1),
(2) Date: Sep. 8, 2022

(87) PCT Pub. No.: WO2021/180888
PCT Pub. Date: Sep. 16, 2021

(65) Prior Publication Data
US 2023/0098954 A1    Mar. 30, 2023

Related U.S. Application Data

(60) Provisional application No. 62/988,557, filed on Mar. 12, 2020.

(51) Int. Cl.
*C03C 17/34* (2006.01)

(52) U.S. Cl.
CPC ...... *C03C 17/3417* (2013.01); *C03C 2217/71* (2013.01); *C03C 2217/734* (2013.01)

(58) Field of Classification Search
None
See application file for complete search history.

(56) References Cited

U.S. PATENT DOCUMENTS

| | | |
|---|---|---|
| 2013/0129945 A1 | 5/2013 | Durandeau et al. |
| 2016/0002098 A1 | 1/2016 | Sternchuss et al. |
| 2017/0355638 A1* | 12/2017 | Varanasi ............ C03C 17/3417 |
| 2020/0123047 A1* | 4/2020 | Mahoney ............ C03C 17/3417 |

FOREIGN PATENT DOCUMENTS

| | | | |
|---|---|---|---|
| AU | 2016283264 A1 | 1/2018 | |
| WO | WO-2018185491 A1 * | 10/2018 | ......... C03C 17/3417 |

* cited by examiner

*Primary Examiner* — Kim S. Horger
(74) *Attorney, Agent, or Firm* — Marshall & Melhorn, LLC

(57) ABSTRACT

A coated glazing includes a transparent glass substrate, and a coating located on the glass substrate. The coating is provided with at least the following layers in sequence starting from the glass substrate: a first layer having a refractive index of more than 1.6, an optional second layer having a refractive index that is less than the refractive index of the first layer, a third layer based on tin dioxide doped with antimony, niobium and/or neodymium, and a fourth layer based on titanium dioxide, wherein the fourth layer is photocatalytic.

20 Claims, 2 Drawing Sheets

COATED GLAZING

Figure 1:
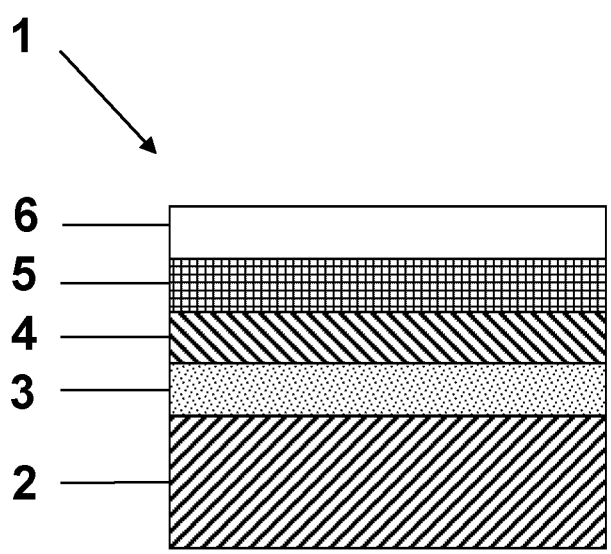

This invention relates to a coated glazing and its use.

BACKGROUND OF THE INVENTION

Self-cleaning glazings have a hydrophilic surface. Rain or other water which contacts the hydrophilic surface will spread over the surface and wash dirt away from it. It is beneficial to glaze windows with self-cleaning glazing sheets because they require less cleaning than ordinary windows. Self-cleaning glazing sheets may be plastic sheets but are usually glass sheets. A self-cleaning surface is usually provided by a hydrophilic coating on the glazing sheet. The coating may, for example, be of silicon oxide or a metal oxide.

A particularly useful type of self-cleaning glazing sheet is one whose hydrophilic coating is photocatalytically active. Photocatalytic activity arises by the photogeneration, in a semiconductor, of a hole-electron pair when the semiconductor is illuminated by light of a particular frequency. The hole-electron pair can be generated in sunlight and can react in humid air to form hydroxy and peroxy radicals on the surface of the semiconductor. The radicals oxidise organic grime on the surface. Photocatalytically active coatings when illuminated thus tend to destroy organic grime on the surface. They also tend to maintain their hydrophilic properties because of the active cleaning of the surface as a consequence of illumination. Photocatalytically active coatings may comprise a semi-conductor with a suitable band gap, for example, titanium oxide.

For some applications, e.g. conservatory glazings, it is desirable to provide self-cleaning glazings with solar control properties to prevent the overheating of enclosed spaces and to afford an aesthetically pleasing level of light transmittance, reflectance and colouration in transmission and/or reflection. Currently available self-cleaning coated glass products tend to exhibit relatively high light transmittance of approximately 83% when deposited on 6 mm clear float glass. It is normal therefore to deposit the coating onto a body-tinted glass (produced by small additions of metal oxides to a float or rolled glass composition which colour the glass bronze, green, blue or grey but do not affect the basic properties of the glass except for changes in the solar energy transmittance) if the requirement is to provide a product with a lower light transmittance. Alternatively, a second coating may be deposited on the glass pane, on the reverse ("tin") side, often by physical vapour deposition (PVD—also commonly referred to as sputter coating), in order to provide the required optical properties.

The use of body-tinted glass is not desirable from a manufacturing standpoint because production of the glass requires the gradual introduction of the tint at the start of a campaign to ensure that the correct level of tint is achieved. Furthermore, when the campaign has finished it takes a significant amount of time for the glass produced on the line to revert to the non-tinted form. These factors result in increased wastage and lost production time.

There are also disadvantages associated with providing a second coating on the reverse side of the glass pane using PVD. Namely, coating on the reverse side cannot be carried out as part of the glass production process and therefore this extra step increases manufacturing costs. Furthermore, there can be issues associated with the quality of the surface on the glass on the tin side, and sputter coatings present handling issues since they are less robust than coatings that have been deposited by chemical vapour deposition (CVD).

Hence, it would be advantageous to provide self-cleaning glazings with solar control properties that at least alleviate the aforementioned problems.

According to a first aspect of the present invention there is provided a coated glazing comprising:
  a transparent glass substrate, and
  a coating located on the glass substrate,
  wherein the coating comprises at least the following layers in sequence starting from the glass substrate:
  a first layer having a refractive index of more than 1.6,
  an optional second layer having a refractive index that is less than the refractive index of the first layer,
  a third layer based on tin dioxide doped with antimony, niobium and/or neodymium, and
  a fourth layer based on titanium dioxide, wherein the fourth layer is photocatalytic.

Surprisingly it has been found that the coated glazing according to the first aspect avoids the above-mentioned disadvantages associated with the current products, while also providing self-cleaning activity and solar control properties by attenuation of the visible light and solar energy transmitted through the coated glazing. Furthermore, the coated glazing exhibits an attractive blue colouration in transmission and/or reflection.

In the context of the present invention, where a layer is said to be "based on" a particular material or materials, this means that the layer predominantly consists of the corresponding said material or materials, which means typically that it comprises at least about 50 at. % of said material or materials.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

References herein such as "in the range x to y" are meant to include the interpretation "from x to y" and so include the values x and y.

In the context of the present invention a transparent material or a transparent substrate is a material or a substrate that is capable of transmitting visible light so that objects or images situated beyond or behind said material can be distinctly seen through said material or substrate.

In the context of the present invention the "thickness" of a layer is, for any given location at a surface of the layer, represented by the distance through the layer, in the direction of the smallest dimension of the layer, from said location at a surface of the layer to a location at an opposing surface of said layer.

In the context of the present invention a "derivative" is a chemical substance related structurally to another chemical substance and theoretically derivable from it.

It should be noted that the refractive index values described herein are reported as average values across 400-780 nm of the electromagnetic spectrum.

In the context of the present invention the "film side" of the transparent glass substrate means a major surface of the glass substrate upon which the coating is located. In the context of the present invention the "glass side" of the transparent glass substrate means a major surface of the glass substrate opposing the major surface upon which the coating is located.

Preferably the third layer is based on tin dioxide doped with antimony.

Preferably the coating is located on a first major surface of the glass substrate. Preferably the first layer is in direct contact with the glass substrate. Preferably the first layer is in direct contact with the second layer. Preferably the second layer is in direct contact with the third layer. Preferably the third layer is in direct contact with the fourth layer. Preferably the coating consists of the first layer, the second layer, the third layer and the fourth layer.

Preferably the first layer has a thickness of at least 5 nm, more preferably at least 10 nm, even more preferably at least 14 nm, most preferably at least 18 nm, but preferably at most 40 nm, more preferably at most 30 nm, even more preferably at most 25 nm, most preferably at most 23 nm.

Preferably the second layer has a thickness of at least 5 nm, more preferably at least 12 nm, even more preferably at least 15 nm, most preferably at least 18 nm, but preferably at most 40 nm, more preferably at most 30 nm, even more preferably at most 25 nm, most preferably at most 22 nm.

Preferably the third layer has a thickness of at least 130 nm, more preferably at least 160 nm, even more preferably at least 175 nm, most preferably at least 185 nm, but preferably at most 365 nm, more preferably at most 315 nm, even more preferably at most 265 nm, most preferably at most 215 nm.

Preferably the fourth layer has a thickness of at least 8 nm, more preferably at least 13 nm, even more preferably at least 15 nm, most preferably at least 16 nm, but preferably at most 40 nm, more preferably at most 30 nm, even more preferably at most 23 nm, most preferably at most 18 nm.

Preferably the first layer has a refractive index of 1.8 or more. More preferably the first layer has a refractive index of from 1.8 to 2.5. Even more preferably the first layer has a refractive index of from 1.8 to 2.2.

Preferably the first layer is based on an oxide of a metal, more preferably the first layer is based on tin dioxide, niobium oxide, titanium dioxide, SiCO or tantalum oxide. Preferably, when the first layer is based on tin dioxide, niobium oxide, titanium dioxide or tantalum oxide, the second layer is present. Preferably, when the first layer is based on SiCO, the second layer is not present. Most preferably the first layer is based on tin dioxide. In certain embodiments, the first layer may consist essentially of tin dioxide. Preferably the first layer consists of tin dioxide. Preferably the first layer is undoped.

Any of the first layer, the second layer, the third layer and the fourth layer may also comprise other constituents including a trace amount or more of other elements such as, for example, carbon. As used herein, the phrase "trace amount" is an amount of a constituent of a coating layer that is not always quantitatively determinable because of its minuteness.

Preferably the second layer has a refractive index of 1.6 or less. More preferably the second layer has a refractive index of from 1.2 to 1.6. Even more preferably the second layer has a refractive index of from 1.2 to 1.5.

Preferably the second layer is based on an oxide of a metalloid, more preferably the second layer is based on silicon dioxide or silicon oxynitride. Most preferably the second layer is based on silicon dioxide. In certain embodiments, the second layer may consist essentially of silicon dioxide. Preferably the second layer consists of silicon dioxide. Preferably the second layer is undoped. Preferably the second layer is present.

Preferably for the third layer based on tin dioxide doped with antimony, niobium and/or neodymium the dopant is present in an amount of at least 1.0 at %, more preferably at least 1.5 at %, even more preferably at least 2.0 at %, most preferably at least 2.5 at %, but preferably at most 10.0 at %, more preferably at most 5.0 at %, even more preferably at most 3.5 at %, most preferably at most 3.0 at %.

Preferably the fourth layer is undoped.

All transmittance, reflectance and colour (a* and b*) values mentioned in this specification are according to the CIELAB colour scale system using Illuminant D65, ten degree observer.

Preferably the coated glazing exhibits a maximum visible light transmittance of 70%, more preferably a maximum visible light transmittance of 60%, more preferably a maximum visible light transmittance of 55%, most preferably a maximum visible light transmittance of 50%, but preferably a minimum visible light transmittance of 25%, more preferably a minimum visible light transmittance of 35%, more preferably a minimum visible light transmittance of 40%, most preferably a minimum visible light transmittance of 45%.

Preferably the coated glazing exhibits a maximum visible light film side reflectance of 35%, more preferably a maximum visible light film side reflectance of 25%, even more preferably a maximum visible light film side reflectance of 18%, most preferably a maximum visible light film side reflectance of 16%, but preferably a minimum visible light film side reflectance of 5%, more preferably a minimum visible light film side reflectance of 10%, more preferably a minimum visible light film side reflectance of 12%, most preferably a minimum visible light film side reflectance of 14%.

Preferably the coated glazing exhibits a maximum visible light glass side reflectance of 30%, more preferably a maximum visible light glass side reflectance of 20%, even more preferably a maximum visible light glass side reflectance of 13%, most preferably a maximum visible light glass side reflectance of 11% but preferably a minimum visible light glass side reflectance of 3%, more preferably a minimum visible light glass side reflectance of 6%, more preferably a minimum visible light glass side reflectance of 8%, most preferably a minimum visible light glass side reflectance of 9%.

Preferably the coated glazing exhibits a maximum Total Solar Energy Transmittance or G-value of 0.7, more preferably a maximum G-value of 0.6, more preferably a maximum G-value of 0.5, most preferably a maximum G-value of 0.45.

Preferably the coated glazing exhibits an a* coordinate in reflection on the film side of at least −10, more preferably at least −6, even more preferably at least −5, but preferably at most 4, more preferably at most −1, even more preferably at most −3.

Preferably the coated glazing exhibits a b* coordinate in reflection on the film side of at least −25, more preferably at least −19, even more preferably at least −17, but preferably at most −3, more preferably at most −6, even more preferably at most −8.

Preferably the coated glazing exhibits an a* coordinate in reflection on the glass side of at least −5, more preferably at least −3, even more preferably at least −1, but preferably at most 7, more preferably at most 5, even more preferably at most 3.

Preferably the coated glazing exhibits a b* coordinate in reflection on the glass side of at least −20, more preferably at least −17, even more preferably at least −16, but preferably at most −5, more preferably at most −8, even more preferably at most −10.

Preferably the coated glazing exhibits an a* coordinate in transmission of at least −10, more preferably at least −4, even more preferably at least −3, but preferably at most 5, more preferably at most 1, even more preferably at most 0.

Preferably the coated glazing exhibits a b* coordinate in transmission of at least −10, more preferably at least −5, even more preferably at least −4, but preferably at most 5, more preferably at most 1, even more preferably at most 0.

Preferably the coating has a specific photocatalytic activity in accordance with ISO/DIS 10678:2010 of greater than 0.4 nmol/cm$^2$h, more preferably greater than 0.5 nmol/cm$^2$h, even more preferably greater than 0.6 nmol/cm$^2$h, even more preferably greater than 0.7 nmol/cm$^2$h, most preferably greater than 0.8 nmol/cm$^2$h.

Preferably the coating has a photocatalytic activity in accordance with EN 1096-5:2011 represented by a mean global change of haze of up to 3%, more preferably up to 2%, even more preferably up to 1.5%, most preferably up to 1%.

The transparent glass substrate may be clear or tinted. Preferably the transparent glass substrate is a clear transparent glass substrate. The transparent glass substrate may be a metal oxide-based glass pane. The glass pane may be a clear or tinted float glass pane. Preferably the glass pane is a clear glass pane. A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2% and $Fe_2O_3$ 0.005-2%. The glass composition may also contain other additives, for example, refining aids, which would normally be present in an amount of up to 2%. By clear float glass, it is meant a glass having a composition as defined in BS EN 572-1 and BS EN 572-2 (2004). For clear float glass, the $Fe_2O_3$ level by weight is typically 0.11%. Float glass with an $Fe_2O_3$ content less than about 0.05% by weight is typically referred to as low iron float glass. Such glass usually has the same basic composition of the other component oxides i.e. low iron float glass is also a soda-lime-silicate glass, as is clear float glass. Typically tinted float glass has at least 0.5% by weight $Fe_2O_3$, e.g. 1.0% by weight $Fe_2O_3$. Alternatively the glass pane is a borosilicate-based glass pane, an alkali-aluminosilicate-based glass pane, or an aluminium oxide-based crystal glass pane.

Preferably the coated glazing comprises:
a transparent glass substrate, and
a coating located on the glass substrate,
wherein the coating comprises at least the following layers in sequence starting from the glass substrate:
a first layer having a refractive index of more than 1.6,
a second layer having a refractive index that is less than the refractive index of the first layer,
a third layer based on tin dioxide doped with antimony, niobium and/or neodymium, and
a fourth layer based on titanium dioxide, wherein the fourth layer is photocatalytic.

More preferably the coated glazing comprises:
a clear transparent glass substrate, and
a coating located on the glass substrate,
wherein the coating comprises at least the following layers in sequence starting from the glass substrate:
a first layer having a refractive index of more than 1.6, wherein the first layer is based on tin dioxide;
a second layer having a refractive index that is less than the refractive index of the first layer, wherein the second layer is based on silicon dioxide;
a third layer based on antimony doped tin dioxide; and
a fourth layer based on titanium dioxide, wherein the fourth layer is photocatalytic.

More preferably the coated glazing comprises:
a clear transparent glass substrate, and
a coating located on the glass substrate,
wherein the coating comprises at least the following layers in sequence starting from the glass substrate:
a first layer having a refractive index of more than 1.6, wherein the first layer is based on tin dioxide, and wherein the first layer has a thickness of at least 5 nm, but at most 35 nm;
a second layer having a refractive index that is less than the refractive index of the first layer, wherein the second layer is based on silicon dioxide, and wherein the second layer has a thickness of at least 10 nm, but at most 40 nm;
a third layer based on antimony doped tin dioxide, wherein the third layer has a thickness of at least 130 nm, but at most 365 nm; and
a fourth layer based on titanium dioxide, wherein the fourth layer is photocatalytic, and wherein the fourth layer has a thickness of at least 10 nm, but at most 25 nm.

For the immediately preceding three embodiments, preferably the coating consists of the first layer, the second layer, the third layer and the fourth layer.

Preferably, in use, the first major surface of the glass substrate on which the coating is located faces away from a building in which it has been installed, i.e. the first major surface of the glass substrate faces the external environment and would commonly be named surface #1.

In certain embodiments the coated glazing may further comprise a second coating located on an opposing major surface of the glass substrate, i.e. the coating referred to in the preceding paragraphs is located on a first major surface of the glass substrate and the second coating is located on the opposing major surface of the glass substrate. The second coating may comprise an antireflection, low-emissivity and/or solar control coating. Preferably, in use, the first major surface (surface #1) of the glass substrate faces away from a building in which it has been installed and the opposing major surface (surface #2) of the glass substrate faces towards said building in which it has been installed.

In some embodiments an opposing major surface of the glass substrate may be bonded to a second glass substrate by a ply of plastics interlayer. Preferably the plastics interlayer comprises polyvinyl butyral or PVB. Any of the opposing major surface of the glass substrate and either surface of the second glass substrate may be coated, for example with an antireflection, low-emissivity and/or solar control coating.

In particular embodiments the coated glazing of the first aspect, e.g. the coated glazing of the two immediately preceding paragraphs, may be combined with further glass substrates (e.g. one or two further glass substrates) to form a glazing unit. The coated glazing may be held in a spaced apart relationship with any adjacent further glass substrate to form an insulated glazing unit. Any further glass substrate may be held in a spaced apart relationship with any adjacent further glass substrate to form an insulated glazing unit.

According to a second aspect of the present invention there is provided the use of the coated glazing of the first aspect to provide self-cleaning and solar control properties. Preferably said use occurs in architectural or automotive applications.

Any feature set out above in relation to the first aspect of the present invention may also be utilised in relation to any other aspects of the present invention.

Any invention described herein may be combined with any feature of any other invention described herein mutatis mutandis.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

DRAWINGS

Figure 2:
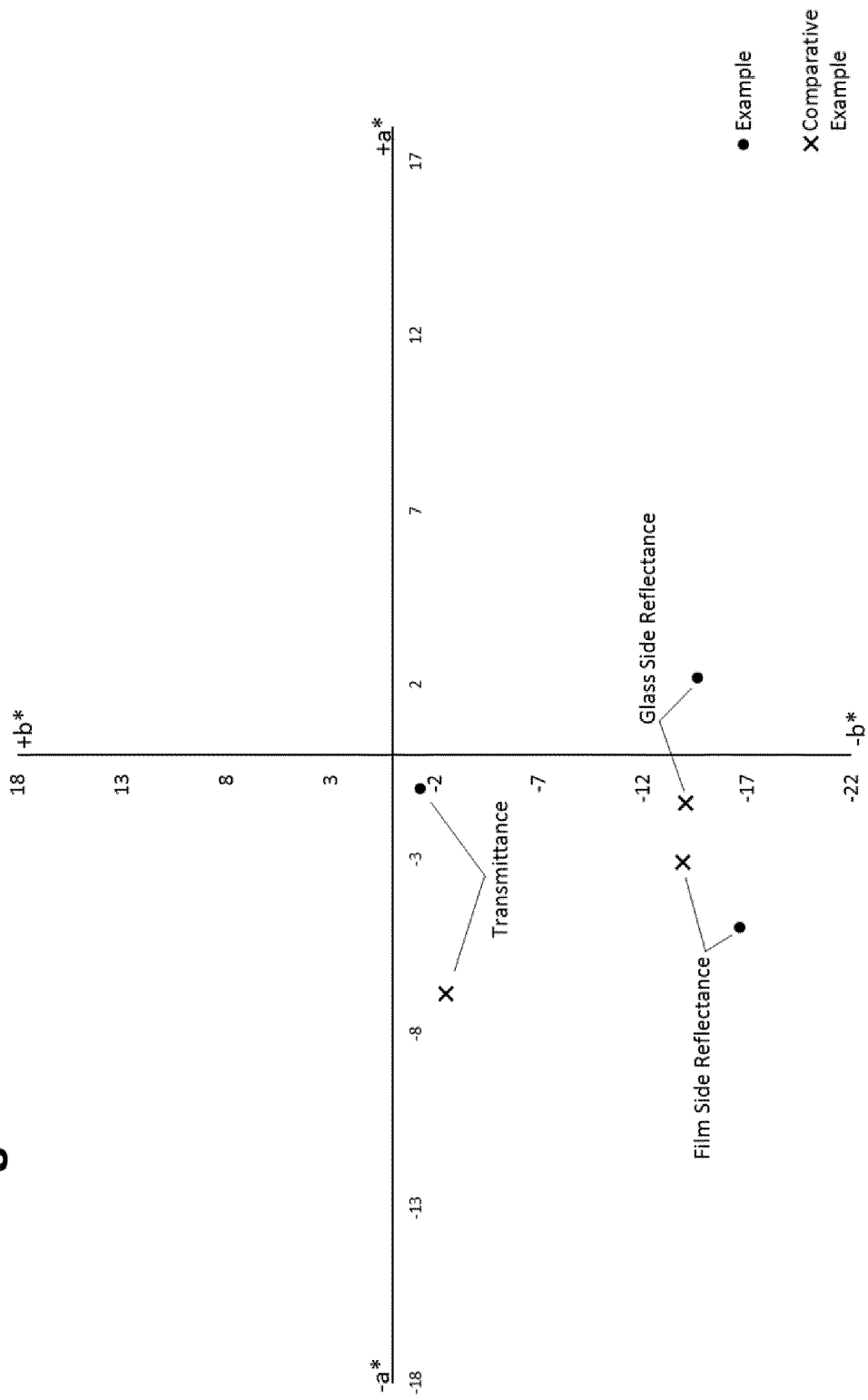

The invention will now be further described by way of the following specific embodiments, which are given by way of illustration and not of limitation, with reference to the accompanying drawing in which:

FIG. 1 is a schematic view, in cross-section, of a coated glazing in accordance with certain embodiments of the present invention, and FIG. 2 is a CIELAB colour chart of a coated glazing in accordance with certain embodiments of the present invention in comparison with a known coated glazing.

BRIEF DESCRIPTION

FIG. 1 shows a cross-section of a coated glazing 1 according to certain embodiments of the present invention. Coated glazing 1 comprises a transparent float glass substrate 2 that has been sequentially coated using CVD with a layer based on tin dioxide 3, a layer based on silicon dioxide 4, a layer based on antimony doped tin oxide 5 and a layer based on titanium dioxide 6. The CVD may be carried out in conjunction with the manufacture of the glass substrate in the float glass process.

EXAMPLES

Examples 1-4 according to the invention were prepared using atmospheric pressure CVD as part of the float glass process. The transparent glass substrate used for each Example was clear soda-lime-silica glass with a thickness of 6 mm for Examples 1-3 and 4 mm for Example 4. Comparative Example 1 was commercially available Pilkington Activ™ Blue, of 4 mm thickness.

The coating for each Example according to the invention consisted of the following four layers starting from the glass substrate: $SnO_2/SiO_2/SnO_2:Sb/TiO_2$.

The $SnO_2$ layer was deposited over the glass surface using the following components:

$N_2$ carrier gas, $O_2$, dimethyltin dichloride, and $H_2O$.

The $SiO_2$ layer was deposited over the glass surface using the following components:

$N_2$ carrier gas, He carrier gas, $O_2$, $C_2H_4$, and $SiH_4$.

The $SnO_2:Sb$ layer was deposited over the glass surface using the following components:

$N_2$ and He carrier gas, $O_2$, dimethyltin dichloride, 30-50 wt % triphenyl antimony in ethyl acetate, and $H_2O$.

The $TiO_2$ layer was deposited over the glass surface using the following components:

Titanium tetrachloride in ethyl acetate (ratio EtOAc:$TiCl_4$ 1.8-2.2).

The optical properties of the resultant coated glazing were determined using a HunterLab™ Ultrascan Pro spectrophotometer. The layer thicknesses of the Examples were determined by scanning electron microscopy (SEM) using an FEI Nova NanoSEM™ 450 and EDAX Octane plus EDS detector with TEAM software. The optical properties and layer thicknesses of the Examples are shown below in Tables 1 and 2:

TABLE 1

Optical properties for Examples according to the invention and a Comparative Example

| Example | Transmittance | | | Film Side Reflectance | | | Glass Side Reflectance | | |
|---|---|---|---|---|---|---|---|---|---|
| | % | a* | b* | % | a* | b* | % | a* | b* |
| 1 | 48.3 | −2.6 | −4.0 | 14.8 | −3.4 | −10.0 | 9.5 | −1.5 | −11.6 |
| 2 | 48.3 | −2.4 | −3.5 | 16.4 | −3.6 | −9.2 | 10.3 | −2.7 | −10.7 |
| 3 | 49.1 | −2.4 | −3.8 | 15.3 | −3.8 | −9.3 | 9.9 | −2.2 | −10.7 |

TABLE 1-continued

Optical properties for Examples according to the invention and a Comparative Example

|  | Transmittance | | | Film Side Reflectance | | | Glass Side Reflectance | | |
|---|---|---|---|---|---|---|---|---|---|
| Example | % | a* | b* | % | a* | b* | % | a* | b* |
| 4 | 45.0 | −1.0 | −1.3 | 17.3 | −5.0 | −16.6 | 9.6 | 2.2 | −14.6 |
| Comparative Example 1 | 58.6 | −6.8 | −2.5 | 15.1 | −3.1 | −13.9 | 10.9 | −1.4 | −14.0 |

TABLE 1

Layer thicknesses for Examples according to the invention and a Comparative Example

| | Layer Thicknesses (nm) | | | |
|---|---|---|---|---|
| Example | $SnO_2$ | $SiO_2$ | $SnO_2$:Sb | $TiO_2$ |
| 1 | 21.1 | 19.6 | 204.5 | 15.9 |
| 2 | 21.5 | 20.2 | 197.7 | 18.4 |
| 3 | 22.2 | 19.6 | 193.9 | 16.3 |
| 4 | 14.6 | 29.2 | 139.7 | 23.7 |
| Comparative Example 1 | — | 30.0 | — | 17.3 |

Table 1 shows that the coated glazings according to the present invention, Examples 1-4, afford an aesthetically pleasing level of visible light transmittance and reflectance from both sides. Moreover, the coated glazings also exhibit an attractive blue colouration in both transmission and reflection. The slight differences in optical properties between Examples 1-3 on one hand and Example 4 on the other are due to Example 4 having a thicker $TiO_2$ layer. The fact that the coatings have been deposited via CVD means that they are more robust than PVD coatings.

The comparison between the colour properties of Example 4 and those of Comparative Example 1 is depicted in the CIELAB chart of FIG. 2. Example 4 has a similar level of blueness (negative b*) to Comparative Example 1 in transmission but is desirably far less green (negative a*). The film side colour in reflection of Example 4 is slightly bluer and greener but comparable to that of Comparative Example 1. The glass side colour in reflection of Example 4 is the same level of blue and slightly red (positive a*) rather than slightly green compared to Comparative Example 1. Since both the film side and glass side reflectance of Example 4 is so low, the colour in reflection is less critical than the colour in transmission. Overall, the less green colouration in transmission and the similar level of blue colouration in both forms of reflection in comparison with Comparative Example 1 means that Example 4 is generally more attractive to observers.

Example 4 and Comparative Example 1 were tested for photocatalytic activity according to ISO/DIS 10678:2010. The coating of Example 4 was found to exhibit a specific photocatalytic activity of 0.69 nmol/cm²h and the coating of Comparative Example 1 achieved a value of 1.43 nmol/cm²h. Whilst the coating of Example 4 exhibits lower photocatalytic activity than Comparative Example 1, nevertheless it provides an acceptable level of performance.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A coated glazing comprising:
   a transparent glass substrate, and a coating located on the glass substrate,
   wherein the coating comprises at least the following layers in sequence starting from the glass substrate:
   a first layer having a refractive index of more than 1.6,
   an optional second layer having a refractive index that is less than the refractive index of the first layer,
   a third layer based on tin dioxide doped with antimony, niobium and/or neodymium, wherein the third layer has a thickness of at least 160 nm, and
   a fourth layer based on titanium dioxide, wherein the fourth layer is photocatalytic.

2. The coated glazing according to claim 1, wherein the coating consists of the first layer, the second layer, the third layer and the fourth layer.

3. The coated glazing according to claim 1, wherein the first layer has a thickness of at least 5 nm, but at most 40 nm.

4. The coated glazing according to claim 1, wherein the second layer has a thickness of at least 5 nm, but at most 40 nm.

5. The coated glazing according to claim 1, wherein the third layer has a thickness of at most 365 nm.

6. The coated glazing according to claim 1, wherein the fourth layer has a thickness of at least 8 nm, but at most 40 nm.

7. The coated glazing according to claim 1, wherein the first layer is based on an oxide of a metal.

8. The coated glazing according to claim 1, wherein the second layer is based on an oxide of a metalloid.

9. The coated glazing according to claim 1, wherein the coated glazing exhibits a maximum visible light transmittance of 70%.

10. The coated glazing according to claim 1, wherein the coated glazing exhibits an a* coordinate in reflection on a film side of at least −10, but at most 4, and a b* coordinate in reflection on the film side of at least −25, but at most −7.

11. The coated glazing according to claim 1, wherein the coated glazing exhibits an a* coordinate in transmission of at least −10, but at most 5, and a b* coordinate in transmission of at least −10, but at most 5.

12. The coated glazing according to claim 1, wherein the coating has a specific photocatalytic activity in accordance with ISO/DIS 10678:2010 of greater than 0.4 nmol/cm²h.

13. The coated glazing according to claim 1, wherein the transparent glass substrate is a clear transparent glass substrate.

14. The coated glazing according to claim 1, wherein the coated glazing further comprises a second coating located on an opposing major surface of the glass substrate.

15. A coated glazing comprising:
    a clear transparent glass substrate, and a coating located on the glass substrate, wherein the coating comprises at least the following layers in sequence starting from the glass substrate:

a first layer having a refractive index of more than 1.6, wherein the first layer is based on tin dioxide, and wherein the first layer has a thickness of at least 5 nm, but at most 35 nm;

a second layer having a refractive index that is less than the refractive index of the first layer, wherein the second layer is based on silicon dioxide, and wherein the second layer has a thickness of at least 10 nm, but at most 40 nm;

a third layer based on antimony doped tin dioxide, wherein the third layer has a thickness of at least 160 nm, but at most 365 nm; and a fourth layer based on titanium dioxide, wherein the fourth layer is photocatalytic, and wherein the fourth layer has a thickness of at least 10 nm, but at most 25 nm.

16. The coated glazing according to claim 1, wherein the first layer is based on tin dioxide, tin oxide, niobium oxide, titanium dioxide or tantalum oxide.

17. The coated glazing according to claim 1, wherein the first layer is based on tin dioxide.

18. The coated glazing according to claim 1, wherein the coated glazing exhibits a maximum visible light transmittance of 60%.

19. The coated glazing according to claim 1, wherein the second layer is based on silicon dioxide or silicon oxynitride.

20. The coated glazing according to claim 1, wherein the second layer is based on silicon dioxide.

* * * * *